(12) United States Patent
Ducharme

(10) Patent No.: US 7,406,598 B2
(45) Date of Patent: Jul. 29, 2008

(54) METHOD AND SYSTEM FOR SECURE CONTENT DISTRIBUTION

(75) Inventor: Paul Ducharme, Scarborough (CA)

(73) Assignee: ViXS Systems Inc., Toronto, Ontario (CA)

( * ) Notice: Subject to any disclaimer, the term of this patent is extended or adjusted under 35 U.S.C. 154(b) by 906 days.

(21) Appl. No.: 10/830,242

(22) Filed: Apr. 22, 2004

(65) Prior Publication Data

US 2005/0182948 A1   Aug. 18, 2005

Related U.S. Application Data

(60) Provisional application No. 60/545,089, filed on Feb. 17, 2004.

(51) Int. Cl.
*G06F 1/24* (2006.01)

(52) U.S. Cl. .................. 713/171; 713/155; 713/159

(58) Field of Classification Search ............ 713/171, 713/155, 159
See application file for complete search history.

(56) References Cited

U.S. PATENT DOCUMENTS

| | | |
|---|---|---|
| 4,866,395 A | 9/1989 | Hostetter |
| 5,027,203 A | 6/1991 | Samad et al. |
| 5,093,847 A | 3/1992 | Cheng |
| 5,115,812 A | 5/1992 | Sano et al. |
| 5,253,056 A | 10/1993 | Puri |
| 5,475,434 A | 12/1995 | Kim |
| 5,563,950 A | 10/1996 | Easter et al. |
| 5,602,589 A | 2/1997 | Vishwanath et al. |
| 5,635,985 A | 6/1997 | Boyce et al. |
| 5,644,361 A | 7/1997 | Ran et al. |
| 5,652,749 A | 7/1997 | Davenport et al. |
| 5,732,391 A | 3/1998 | Fiocca |
| 5,737,020 A | 4/1998 | Hall et al. |

(Continued)

FOREIGN PATENT DOCUMENTS

EP      0661826 A2      7/1995

(Continued)

OTHER PUBLICATIONS

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

(Continued)

*Primary Examiner*—Thomas R. Peeso

(57) ABSTRACT

A system on a chip (SOC) device is disclosed comprising external outputs, and external inputs. A first secure storage location is operably decoupled from all of the external outputs of the SOC device during a normal mode of operation. By being decoupled from all external outputs, representations of the data stored at the first secure device are prevented from being provided to the external outputs. The decryption engine is also included on the system on a chip, comprising a first data input, and a private key input coupled to a first portion of the first secure storage location, and an output coupled to a second secure location. The decryption engine is operable to determine decrypted data from data received at the first data input based upon a private key received at the private key input. The decryption engine is further operable to write the decrypted data only to the first secure memory location and the second secure location.

38 Claims, 5 Drawing Sheets

U.S. PATENT DOCUMENTS

| | | |
|---|---|---|
| 5,740,028 A | 4/1998 | Sugiyama et al. |
| 5,844,545 A | 12/1998 | Suzuki et al. |
| 5,850,443 A | 12/1998 | Van Oorschot et al. |
| 5,940,130 A | 8/1999 | Nilsson et al. |
| 5,996,029 A | 11/1999 | Sugiyama et al. |
| 6,005,623 A | 12/1999 | Takahashi et al. |
| 6,005,624 A | 12/1999 | Vainsencher |
| 6,014,694 A | 1/2000 | Aharoni et al. |
| 6,040,863 A | 3/2000 | Kato |
| 6,081,295 A | 6/2000 | Adolph et al. |
| 6,141,693 A | 10/2000 | Perlman et al. |
| 6,144,402 A | 11/2000 | Norsworthy et al. |
| 6,167,084 A | 12/2000 | Wang et al. |
| 6,182,203 B1 | 1/2001 | Simar, Jr. et al. |
| 6,215,821 B1 | 4/2001 | Chen |
| 6,219,358 B1 | 4/2001 | Pinder et al. |
| 6,222,886 B1 | 4/2001 | Yogeshwar |
| 6,236,683 B1 | 5/2001 | Mougeat et al. |
| 6,259,741 B1 | 7/2001 | Chen et al. |
| 6,263,022 B1 | 7/2001 | Chen et al. |
| 6,300,973 B1 | 10/2001 | Feder et al. |
| 6,307,939 B1 | 10/2001 | Vigarie |
| 6,314,138 B1 | 11/2001 | Lemaguet |
| 6,323,904 B1 | 11/2001 | Knee |
| 6,366,614 B1 | 4/2002 | Pian et al. |
| 6,385,248 B1 | 5/2002 | Pearlstein et al. |
| 6,438,168 B2 | 8/2002 | Arye |
| 6,480,541 B1 | 11/2002 | Girod et al. |
| 6,526,099 B1 | 2/2003 | Christopoulos et al. |
| 6,549,561 B2 | 4/2003 | Crawford |
| 6,584,509 B2 | 6/2003 | Putzolu |
| 6,714,202 B2 | 3/2004 | Dorrell |
| 6,724,726 B1 | 4/2004 | Coudreuse |
| 6,748,020 B1 | 6/2004 | Eifrig et al. |
| 2001/0026591 A1 | 10/2001 | Keren et al. |
| 2002/0106022 A1 | 8/2002 | Takahashi et al. |
| 2002/0110193 A1 | 8/2002 | Kyoon et al. |
| 2002/0138259 A1 | 9/2002 | Kawahara |
| 2002/0145931 A1 | 10/2002 | Pitts |
| 2002/0196851 A1 | 12/2002 | Lecoutre |
| 2003/0093661 A1 | 5/2003 | Loh et al. |
| 2003/0152148 A1 | 8/2003 | Laksono |

FOREIGN PATENT DOCUMENTS

| | | |
|---|---|---|
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| EP | 1087625 A2 | 3/2001 |
| JP | 07-210670 A | 8/1995 |
| WO | WO 01/95633 A2 | 12/2001 |
| WO | WO 02/080518 A2 | 10/2002 |

OTHER PUBLICATIONS

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG20030 61S0070> retrieved Jul. 8, 2003.

Aggarwal, Manoj et al., "Efficient Huffman Decoding," 2000 IEEE, 0-7803-6297-7, pp. 936-939, University of Illinois at Urbana-Champaign, Urbana, IL.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," in Proc. ICIP 2000, University of Erlangen-Buremberg, Erlangen, Germany.

Ramanujan, Ranga S. et al., "Adaptive Streaming of MPEG Video Over IP Networks," 22nd IEEE Conference on Local Computer Networks (LCN '97), Nov. 2-5, 1997, IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014 , Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Liu, Julia J., "ECE497KJ Course Project: Applications of Wiener Filtering In Image and Video De-Noising," pp. 1-15, May 21, 1997.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"Conexant Products & Tech Info: Product Briefs: CX24108," 2000-2002 Conexant Systems, Inc. access on Apr. 20, 2001.

"Conexant Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros. Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"Ice Fyre Semiconductor: IceFyre 5-GHz OFDM Modern Solution," Sep. 2001, pp. 1-6, IceFyre: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

U.S. Appl. No. 09/995,308, filed Nov. 27, 2001, Titled "A Monolithic Semiconductor Device for Preventing External Access to An Encryption Key".

Actions on the Merits by the U.S.P.T.O. as of Sep. 12, 2007, 1 page.

METHOD AND SYSTEM FOR SECURE CONTENT DISTRIBUTION

CROSS-REFERENCE TO RELATED APPLICATION(S)

The present application claims priority from U.S. Provisional Application No. 60/545,089, filed Feb. 17, 2004, entitled "METHODS AND PROCESSES FOR SECURE CONTENT DISTRIBUTION AND RIGHTS MANAGEMENT," naming inventor Paul Ducharme, which application is incorporated by reference herein in its entirety.

FIELD OF THE DISCLOSURE

The present disclosure relates generally to providing secure communications and more particularly to a device and methods of protecting data used in secure communications.

BACKGROUND

Several forms of digital audio and video content are available to consumers. Audio and video content can be provided through media, such as compact disks (CD) or digital versatile disks (DVD). Service providers can be used to present audio and video content by broadcasting digital audio and video content to consumers, such as through broadband network services, digital cable broadcasts, or digital satellite and terrestrial transmissions. Generally, there are ownership rights associated with the audio and video content and consumers pay for services to receive the audio and video content.

To protect ownership rights, several methods are undertaken to secure audio and video content and ensure only valid consumers receive the content. For example, video associated with DVDs is generally scrambled to prevent undesired copying of DVD video content. Similarly, video content transmitted through digital satellite or digital cable broadcasts can be scrambled to only allow paying consumers to descramble the video content. Encryption and scrambling techniques use secret key or codeword values that are supposed to only be available to a device associated with the consumer, such as a digital cable, or digital satellite, set-top box. Once the secret key and/or codeword values become public knowledge, an unauthorized consumer is capable of descrambling protected audio and video content.

From the above discussion, it should be apparent that systems and methods of providing secured key and codeword protection would be useful.

BRIEF DESCRIPTION OF THE DRAWINGS

Specific embodiments of the present disclosure are shown and described in the drawings presented herein. Various advantages, features and characteristics of the present disclosure, as well as methods, operations and functions of related elements of structure, and the combination of parts and economies of manufacture, will become apparent upon consideration of the following description and claims with reference to the accompanying drawings, all of which form a part of this specification, and wherein:

DETAILED DESCRIPTION OF THE FIGURES

Figure 1:
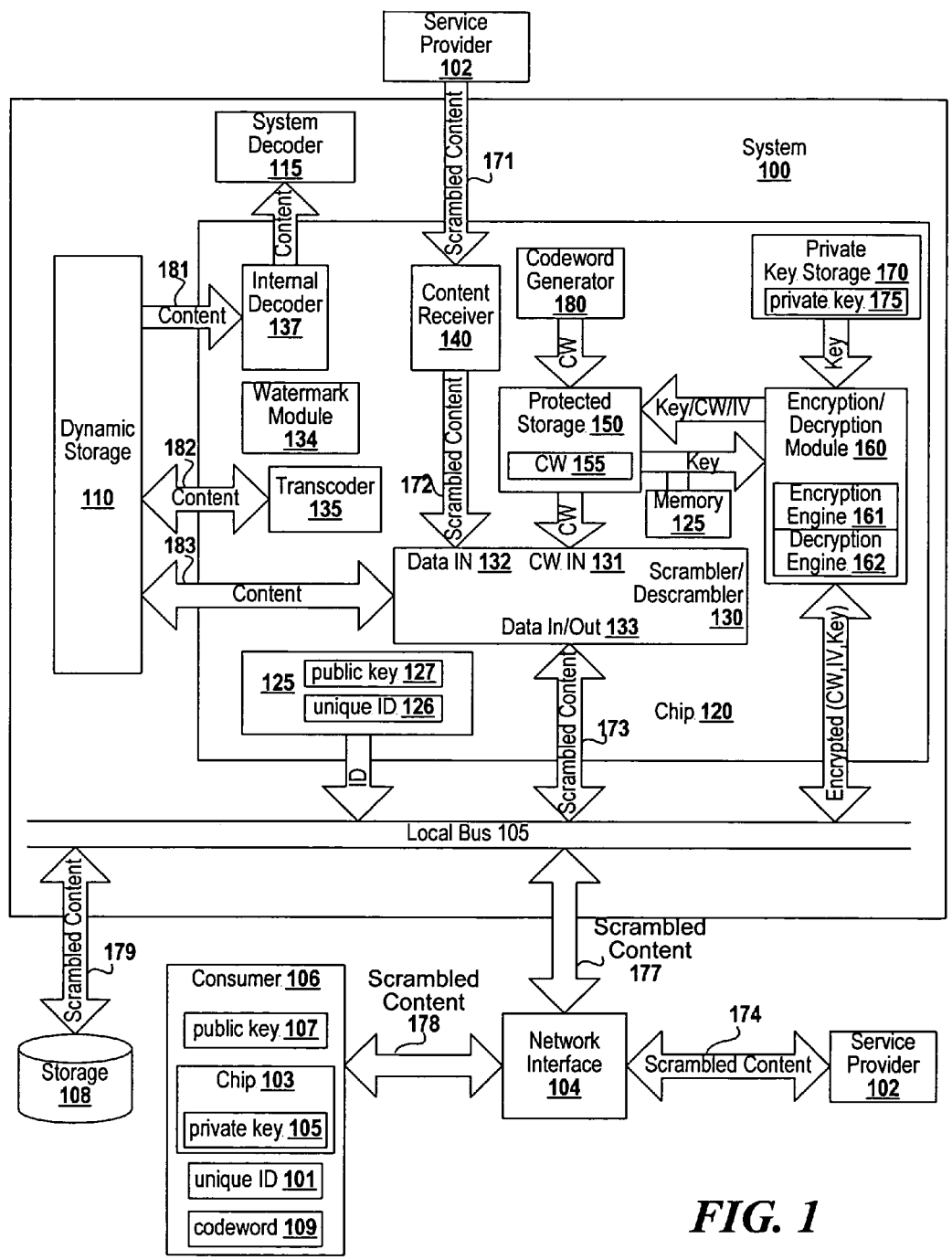
FIG. 1 is a block diagram illustrating a system for processing scrambled information according to one embodiment of the present disclosure.

At least one embodiment of the present disclosure provides a system on a chip (SOC) for processing secure data. The SOC includes external output interfaces for providing information from the SOC to an external component or device. The SOC also includes external input interfaces for providing information to the SOC device from the external component or device. The SOC includes a first storage location that is operably de-coupled from all external nodes of the SOC. The first storage location is operably de-coupled so as to prevent representations of data stored in the first storage location from being provided at an external output interface. The SOC also includes a decryption engine having a first data input, and a private key input coupled to a first portion of the first secure storage location. In one embodiment, a sensitive decryption key, such as the private key, is stored in the first portion of the first secure storage location. The decryption engine is capable of decrypting data received through the first data input based on the sensitive decryption key and the decryption engine is further capable of storing decrypted data only to secure memory. In one embodiment of the present disclosure, the SOC is capable of performing decryption and descrambling using sensitive decryption key and codeword values stored in storage locations internal to the SOC. Accordingly, access to sensitive decryption and descrambling values can be limited to the decryption engine and descrambler, and cannot be accessed external to the SOC. An advantage of at least one embodiment of the present disclosure is that sensitive values can be protected from malicious attacks designed to pirate protected audio or video content.

For purposes of discussion, the following terms are described. Content pertains to audio or video or other data that is interchanged between components, such as a service provider, consumer or gateway. A medium for the transfer of content can include, but is not limited to, satellite, cable or terrestrial broadcasts, CD, DVD, network, Internet, telephone line transmission or other mediums. A service provider includes a company or party that produces or distributes content or provides a service that facilitates the transfer of content. A consumer includes a device or party that receives and consumes content, typically as part of an agreement with the service provider. A gateway represents a device or party that provides an interface for the transfer of content between a service provider and a consumer. In one embodiment, a gateway may also operate as a consumer. A pirate includes a party or device that uses illegal or fraudulent methods to receive, duplicate, or re-distribute content, provided by a service provider, intended for a consumer.

Several methods for protecting transferred content from being intercepted by pirates exist. For the purposes of discussion, general methods used will be discussed and described; however, it should be appreciated that more specific methods are known in the art and the specific method used can be selected without departing from the scope of the present disclosure. Scrambling is an algorithm that uses a seed value, referred to as a codeword, to modify large amounts of data in such a way that the data can be de-scrambled using the same codeword. Without the value of the codeword, the scrambled data is not sensible. Examples of scrambling techniques used in the art include, but are not limited to, the Data Encryption Standard (DES), the Triple Data Encryption Standard (3DES), the Advanced Encryption Standard (AES), and the Digital Video Broadcast (DVB) encryption standard. The codeword includes a binary value, generally in multiples of 64 bits, that is used to scramble content. It should be noted that codewords can also include multiple binary values, such as initial vectors and sets of system keys, and that the codeword can change for a given set of content.

As compared to scrambling, encryption is a computationally complex operation that is used in public/private key pairs systems to conceal a small amount of data, which may only be decrypted using an alternate key. Specific examples of encryption include, but are not limited to, the Rivest, Shamir and Adleman (RSA) encryption standard, or the Elliptical Curve Cryptography (ECC) standard. A public key includes a binary value that is used as a seed value in an encryption algorithm. The public key is generally used to encrypt/decrypt messages or values, such as codeword values. A public key is not considered secret and is freely transmitted to others. Generally, messages encrypted using a specific device's public key can only be decrypted using the specific device's private key. The private key includes a binary value that is used as a seed value in encryption/decryption algorithms. The private key is considered secret and not to be distributed to other devices.

Referring now to FIG. 1, a block diagram illustrating a system for processing scrambled information, such as video content, is shown according to one embodiment of the present disclosure. A system 100 is shown acting as a gateway for communication between a service provider 102 and a consumer 106. The service provider 102 provides scrambled content, at interface 171 or 177, containing content to be received by the consumer 106. System 100 ensures security by handling authentication, scrambling/descrambling of the content, and encryption/decryption of sensitive values used to scramble content before re-transmission to the consumer 106. The system 100 includes a system on a chip (SOC), such as SOC 120, which is capable of internally storing and generating sensitive values, such as codeword 155, and private key 175. To prevent descrambling of scrambled content, such as scrambled content transmitted over interfaces 171, 173, 174, 177 and 178, from pirates, sensitive values, such as private key 175 are kept internal to SOC 120 in a secure storage location 170 and can not be accessed external to SOC 120. In one embodiment of the present disclosure, a network interface 104 provides the transfer of information, such as authentication and service requests, or the transfer of scrambled content or data between the service provider 102, the system 100 and the consumer 106. The network interface 104 can represent one of a plurality of different network interfaces, including but not limited to an Ethernet interface, a wireless broadcast interface or a modem and a telephone line, where the type of network interface can be chosen without departing from the scope of the present disclosure.

The system 100 includes the SOC 120, used to securely process scrambled content, such as content received at interfaces 171 or 173, dynamic storage 110 used to store unscrambled content, a system decoder 115 used to decode the content for display, and a local bus 105 used to transfer scrambled content, such as scrambled content and messages provided over interfaces 173, 177 and 179 between the system 100 and the network interface 104 and external storage 108. In one embodiment of the present disclosure, external storage 108 is used by system 100 for the storage of scrambled content 179.

In one embodiment of the present disclosure, SOC 120 includes codeword generator 180, a secure storage location (private key storage) 170 having at least one private key 175, a secure storage location (protected storage) 150 having at least one codeword 155, an encryption/decryption block 160, a scrambler/descrambler 130, content receiver 140, public storage (other memory) 125 having a unique identifier (ID) 126 and a public key 127, a transcoder 135, internal decoder 137 and watermark block 134. The scrambler/descrambler 130 includes a codeword input 131 for interfacing with protected storage 150, a data input 132 for interfacing with content receiver 140 and a data output for interfacing with local bus 105. SOC 120 is used to process security associated with the handling of scrambled content, such as scrambled content received over interfaces 171 or 174, provided from service provider 102. Note that service provider 102 is illustrated as providing content over both the interface 171 and the interface 174. It will be appreciated that the service providers 102 may be a common service provider, or different service providers. For example, the service provider 102 could be a service provider whereby the content received at interface 171 is received over a terrestrial or cable connection, whereas the service provider 102 may be the same or a different service provider that is shown to provide scrambled content to alternate interface 174, such as the Internet. In addition, even though the scrambled content at interface 177 to the local bus 105 is not illustrated as being receivable at the data-in port 132, it will be appreciated that the interfaces illustrated as providing scrambled content within the SOC 120 may actually be common or shared interfaces or interfaces that can otherwise share data amongst themselves. However, in accordance with the present disclosure, the interfaces, whether shared or individual, need to remain decoupled from the protected storage locations 150 and 170 as further described herein.

In one embodiment, system 100 includes a watermark module 134. Watermark module 134 can be used to encode content stored in dynamic storage 110 with a value associated with system 100 or SOC 120, such as unique ID 126. The value is encoded into the content in a manner so that the value can be extracted from the content at a later time. Accordingly, the watermark can be used to track which system or SOC was compromised to extract the content should the content be pirated. It will be appreciated that while the watermark 134 is not specifically illustrated to be connected to any specific component, that the watermark module 134 could be connected in a variety of embodiments. In one embodiment, the watermark module 134 would be connected to the interface 183 between the scrambler/descrambler 130 to insert watermark encoding into the content prior to its being stored in dynamic storage 110. In alternate embodiments, the watermark could be connected to the interconnects 181 or 182 to allow for insertion of the watermark encoding after transcoding of information by the transcoder 135, or after the internal decoding by internal decoder 137 of the content received over interface 181.

Scrambled content is secured through the use of secret values, such as codeword 155 and private key 175. In one embodiment of the present disclosure, system 100 and SOC 120 operate in a blind encryption scheme where the secret values represented by the private keys are not observable outside of SOC 120 by controlling access to the portions of memory used to store those values. A system where a source and destination system each operate in blind encryption mode is referred to as a double-blind encryption system, or a double-blind security system, or a double-blind decryption system.

In a specific embodiment, before a source will provide protected content to a destination it will need to verify that the destination is a blind encryption system, thereby ensuring double-blind operation. Likewise, the destination can verify that a source is a blind encryption system to ensure double-blind operation. Encryption/decryption block 160 includes an encryption engine 161 and a decryption engine 162. The encryption engine 162 uses a provided public key, such as public key 107 to encrypt a value to be transmitted external to SOC 120. It should be noted that the values of the public keys used by the encryption engine 161 can be accessed from protected storage 150 or from other memory associated with system 100 or SOC 120, such as memory 125. Public keys are typically known outside of SOC 120 and do not need to be protected. The decryption engine 162 uses private key 175 to decrypt encrypted information provided to SOC 120. It should be noted that data decrypted by decryption engine 162 should be stored in a secured location, such as protected storage 150 or private key storage 170. Secret values, such as codeword 155 should not be provided external to SOC 120 before being encrypted by encryption engine 161.

Interfaces between SOC 120 and local bus 105, dynamic storage 110, system decoder 115 and service provider 102 represent input interfaces allowing information to be provided to SOC 120 and output interfaces allowing information to be provided from SOC 120. SOC 120 ensures the integrity of scrambled content at interface 173 by protecting secret values and secure storage locations, such private key storage 170 and protected storage 150, from access at any of the interfaces. In one embodiment of the present disclosure, SOC 120 performs tighter security on more critical, or sensitive, information. For example, Table 1 shows a list of different types of information associated with the secure transport of content.

TABLE 1

Values Associated with Secure Content Vs. Security Criticality

| Information Type | Security Criticality | Comment |
| --- | --- | --- |
| Private Key | 1 | Most Critical |
| Group Key | 2 | |
| Service Key | 3 | |
| CW | 4 | |
| Digital HD Content | 5 | |
| Digital SD content | 6 | |
| Analog Content | 7 | |
| Encrypted Key | 8 | |
| Encrypted CW | 9 | |
| Public key | 10 | |
| Scrambled Content | 11 | Least Critical |
| Etc . . . | | |

As shown, in Table 1, some values associated with the processing of secure content are considered more critical to security, such as private key 175 and codeword 155, than others. A measurement of security criticality presented is meant to illustrate a ranking of how valuable a particular information type is to the integrity of a secure system. Information types having a lower valve security criticality ranking, i.e., 1, would be more damaging to the integrity of a secure system if discovered than information types having a higher security criticality ranking. The criticality of an information type, in relation to security, can be lessened by altering the associated information, so it is unusable, such as by encrypting a codeword value or scrambling content. It should be appreciated that while Table 1 provides unique security criticality rankings for each information type, several information types may be assigned to a same security criticality ranking. A security criticality ranking as provided in Table 1 can allow for system definitions that may dictate how information types at or below a particular security criticality value would be protected. For example, an information type having a security criticality ranking of '1' can indicate that neither data nor a representation of the data associated with the information type be provided at an output associated with a secure system, such as SOC 120. In one embodiment of the present disclosure, private key storage 170 and protected storage 150 represent storage locations operably de-coupled from external interfaces of SOC 120 during a normal operating mode. Accordingly, SOC 120 protects private key 175 and codeword 155 from external access.

Figure 2:
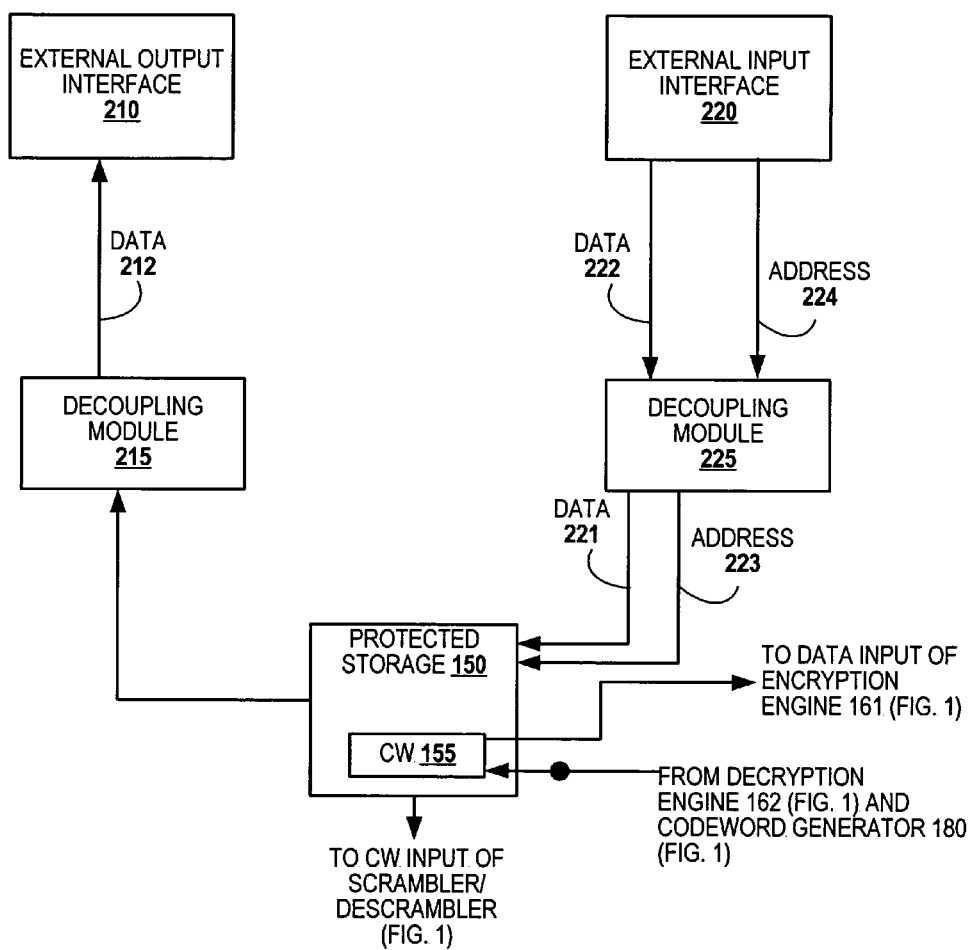
FIG. 2 is a block diagram illustrating a decoupling between a protected storage device that can be decoupled from external interfaces of a system on a chip according to one embodiment of the present disclosure.

Referring now to FIG. 2, a block diagram illustrates storage 150 (FIG. 1) to be decoupled from external input and output interfaces associated with SOC 120, according to one embodiment of the present disclosure. In one embodiment of the present disclosure, SOC 120 includes external interfaces 210 and 220, and decoupling modules 215 and 225. External output interface 210 is used to interface to external components of system 100, such as local bus 105, and provide information, such as scrambled content over interface 173, from SOC 120 to the external components. Similarly, external input interface 220 can be used to provide information from the external components to SOC 120. Decoupling modules 215 and 225 may provide an interface between protected storage 150 and external output interface 210 and external input interface 220, respectively, to provide access to the protected storage in limited circumstances.

In one embodiment, decoupling modules 215 and 225 provide access to portions of protected storage 150 during a test mode of SOC 120. Decoupling module 225 can provide write access to protected storage 150, through data line 222 and address line 224, allowing external input interface 220 to store information in protected storage 150 for the purposes of testing or loading initial values. Decoupling module 215 can be used to provide read access to protected storage 150 to external output interface 210 during a test mode of SOC 120, thereby providing data through data line 212. In one embodiment, external interfaces 210 and 220 include test interfaces associated with SOC 120, such as a JTAG test interface, or other data interfaces. Accordingly, decoupling modules 210 and 220 can be used to store and read values into protected storage 150 during the test mode.

When operating in a secure mode, the decoupling modules 210 and 220 will prevent information stored in protected storage 150, such as the code word 155, from being provided to the external output interface 210. As a result, it will not be possible either through the execution of internal instructions, or by accessing external interfaces 210 and 220 to retrieve data stored within protected storage 150. This is accomplished in one embodiment, by disabling logic in the decoupling module 215 after test mode and/or module 225 through the assertion of specific control bits to disable logic associated with accessing stored information. Alternatively, a physical destruction of a fuse, or fuse-type connection can also be implemented to disable the logic coupling of protected storage 150 from the external output interface 210.

In an alternate embodiment, the decoupling module 225 operates to destroy any data stored at protected storage 150 as part of entering a test mode. In this embodiment, once the data is destroyed and test mode is fully entered, the user would be able to store and read information from protected storage 150. However, the information being stored and read would be information provided solely by the user. Information stored during test mode in protected storage 150 would not be observable external the system once test mode is exited. Data stored during test mode may or may not be observable during test mode, depending upon specific implementations.

In yet another alternate embodiment, any access to the protected storage 150 during a mode other than test mode, would result in the data being destroyed prior to it being read. A further embodiment would result in indeterminate, or predetermined value to be returned when an address request of protected storage 150 is made to decoupling module 225. For example, in response to receiving an address as part of a read request to protected storage 150, the decoupling module 225 can communicate with decoupling module 215 to provide a dummy data to the external output interface 210, thereby bypassing the protected storage 150. This communication can be through protected storage 150, or bypass protected storage 150. Based upon these embodiments, it will be appreciated that both the decoupling module 215 and the decoupling module 225 can be disabled, or that in an alternative implementation, the decoupling module 225 may remain enabled, and possibly not even exist.

It will be further appreciated, that the decoupling modules 215 and 225 may actually represent the lack of specific circuitry implementing the ability to provide information within protected storage 150 to the output interface 210. In other words, even during a test mode, or any other mode of operation, the decoupling module 215 could represent the lack of interface connections prohibiting protected data, such as the code word 155 from ever being provided to an output interface of the SOC. It would be appreciated in such an implementation, that the functionality of the protected storage 150 would need to be verified using alternative test methods, such as providing specific coded data to be descrambled and sent external for verification. Note that where a test mode of operation, and a secure mode of operation (also referred to as a normal mode of operation) exists, the decoupling modules 215 and 225 are designed as such to implement a one-way security enable, whereby after implemented, it is not possible to disable the security measures which prohibit observability of the protected storage 150, which is external SOC 120.

In one embodiment, write access to codeword 155 during normal operation is only allowed through encryption/decryption block 160 and codeword generator 180. Once decoupling modules 215 and 225 are disabled, direct access to protected storage 150 is no longer available to external interfaces 210 and 220. Accordingly, the value of codeword 155 is read accessible only internal to SOC 120, for use at the codeword input 131 of scrambler/descrambler 130 and at a data input of encryption engine 161. The SOC is designed so that the only representation of the value of codeword 155 is only provided external to SOC 120 by first encrypting the value of codeword 155.

Figure 3:
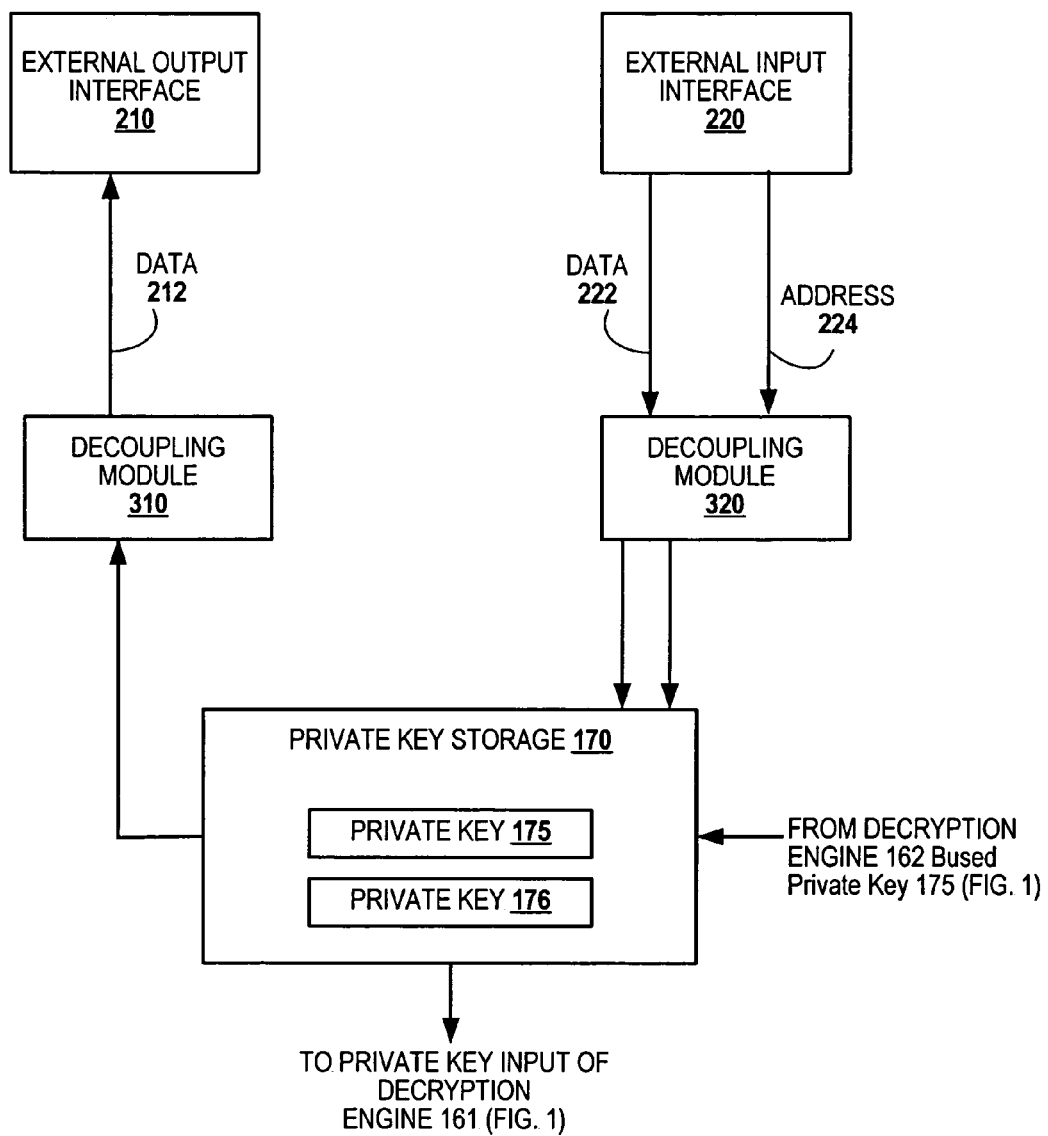
FIG. 3 is a block diagram illustrating a a private key storage device that can be decoupled from external interfaces of a system on a chip according to one embodiment of the present disclosure.

Referring now to FIG. 3, a block diagram illustrating a decoupling of private key storage 170 (FIG. 1) from external input and output interfaces associated with SOC 120, according to one embodiment of the present disclosure. In one embodiment, during a test mode, decoupling module 320 provides write access of private key storage 170 to external input interface 220. Similarly, during the test mode, decoupling module 310 can provide read access of information at private key storage 170 to external output interfaces 210. In an alternate embodiment, no read access is provided to storage 170 during any mode of operation. During the test mode, or an initialization of SOC 120, decoupling module 320 can also be used to store a private key value into a portion of private key storage 170, such as private keys 175 and/or 176. In one embodiment, once the test mode or initialization mode are completed, decoupling modules 310 and 320 are disabled to decouple the storage location 170 from the external output interface 210, and/or to external input interface 220 to prevent further access to private key storage 170. In one embodiment, decoupling modules 310 and 320 are permanently disabled, and only the decryption engine 162 of the encryption/decryption block 160 has access to private key storage 170 at the private key input of the decryption engine 161. In one embodiment, write access to private key storage 170 is provided to the decryption engine 162 of encryption/decryption block 160 to allow encrypted private keys, decrypted by the decryption engine 162 using private key 175, to be written into private key storage 170, such as to private key 176. In an alternate embodiment, only read access of private key storage 170 is allowed and values of private keys, such as private keys 175 and 176, cannot be read accessed by other components of SOC 120 or external to SOC 120. Accordingly, more critical values are kept internal to SOC 120 and only less critical values, such as public key 127, scrambled or encrypted values, are provided external to SOC 120. Decoupling modules 320 and 310 may operate in a manner similar to modules 215 and 225 of FIG. 2.

Referring back to FIG. 1, in one embodiment of the present disclosure, SOC 120 receives scrambled content 171 provided by a service provider, such as service provider 102, intended for a particular consumer, such as consumer 106, connected to network interface 104. The scrambled content 171 is typically scrambled using a codeword generated by the service provider 102. The service provider codeword is encrypted using a public key 127 associated with SOC 102. The decryption engine 162 of encryption/decryption block 160 is capable of decrypting the encrypted value of the received codeword using the value of private key 175. The decrypted codeword value is then stored in protected storage 150 and used by scrambler/descrambler 130 to descramble the scrambled content. The codeword is only accessible by scrambler/descrambler 130 for descrambling scrambled content. It should be noted that additional codewords could be stored in protected storage 150. Furthermore, access to some of the additional codeword portions of protected storage 150 can be made inaccessible by the encryption/decryption block 160. In one embodiment, a portion of protected storage 150, used to store data provided by the decryption engine 162, is secured so that the data is not provided external to SOC 120 in an unencrypted or scrambled form. For example, it may be desirable for codewords from external sources in storage 150, such as codewords from service provider 102, to not be accessible by the encryption/decryption module 160.

In one embodiment of the present disclosure, private key 175 is stored into private key storage 170 as part of a write-once function associated with test or initialization, in which the value of private key 175 can no longer be altered. Furthermore, the value of private key 175 can be uniquely assigned to SOC 120 and other chips similar to SOC 120 will be assigned a different private key value. Similarly, the values of public key 127 and unique ID 126 are uniquely assigned to SOC 120. In one embodiment of the present disclosure, a method of authentication referred to as digital signing, is disabled in encryption/decryption block 160 by not allowing the decryption engine 162 of encryption/decryption block 160 to send decrypted messages to any external output interface. Digital signing can be exploited, such as through the use of a Trojan Horse attack, to uncover the value of a secret codeword, such as codeword 155. By disabling and/or preventing digital signing, SOC 120 can be protected from such an attack. In one embodiment of the present disclosure, encryption/decryption block 160 is further capable of performing encryption operations in parallel with other functions of system 100. Serial execution of decryption code generates measurable changes in current draw that can be detected external to SOC 120 to exploit private keys, such as private key 175. In comparison to serial execution of decryption code, parallel execution of decryption code by the decryption engine 162 cannot be as readily detected. Accordingly, encryption operations can be hidden from external monitoring of system 100.

In one embodiment, the descrambled content is stored in dynamic storage 110, prior to display. In another embodiment, the descrambled content is re-scrambled using an internal codeword, codeword 155, which may be a codeword provided by service provider 102 or generated by the codeword generator 180, prior to storage in dynamic storage 110. Re-scrambled content can be stored, along with an encrypted value of codeword 155, external to system 100, such as in storage 108.

As identified in Table 1, scrambled content is not considered critical. By being scrambled with a particular codeword value, such as codeword 155, the scrambled content cannot be unscrambled without the knowledge of the codeword. Accordingly, scrambled content is generally stored with an encrypted version of the codeword used to scramble the content. In one embodiment, a codeword used to scramble stored data is encrypted using public key 127, associated with SOC 120 and stored with the scrambled content. It should be noted that more than one codeword can be used by SOC 120. In one embodiment, stored content can be associated with a time in which the content can be decrypted, such as a content expiration date. Such an expiration date can be a timecode used by the encryption/decryption block 160 or scrambler/descrambler 130 to determine if the stored content is valid. Alternatively, system 100 can be used to clear stored content based on a timecode associated with the stored content. In another embodiment, codeword values stored with the stored content expire as old codeword values are replaced by new values generated by codeword generator 180. Similar to scrambled content stored by SOC 120, scrambled content sent to consumer 106 is sent with a codeword encrypted using the consumer's public key 107, associated with chip 103 of consumer 106. Accordingly, only consumer 106 can decrypt the codeword, using a private key 105 known only internal to chip 103 of consumer 106, and then descramble the scrambled content.

In one embodiment, codeword generator 180 is used to generate random values and stores the random values as codeword 155 for use by the scrambling engine of the scrambler/descrambler 130. When multiple codewords are generated, new content is scrambled using the newly generated codeword values, the prior value of the codeword is no longer useful for descrambling newly scrambled content. In one embodiment, access to a portion of protected storage 150 used for storing codeword 155 is only accessible by codeword generator 180 to assure that no external devices are allowed to dictate and/or alter the values of codeword 155.

In one embodiment of the present disclosure, transcoder 135 modifies the received content that is stored in dynamic storage 110. Transcoder 135 is capable of altering a bit-rate and/or resolution associated with content stored in dynamic memory 110. For example, the bit-rate and/or resolution associated with the content stored in dynamic memory 110 can be reduced to only a portion of the maximum bit-rate or resolution associated with the content, such as to a standard bit-rate and/or resolution, or can be reduced to match a lower bit-rate or resolution accepted by consumer 106. By reducing the bit-rate and/or resolution associated with content stored in dynamic memory 110, an overall value of the stored content can be reduced. For example, if a pirate compromises the content, the value of the compromised content is lowered due to the quality of the content being degraded from a maximum quality associated with the content. In one embodiment of the present disclosure, the internal decoder 137, associated with the SOC 120, is used to provide decoded content to the portion of system 100 external chip 120.

In one embodiment of the present disclosure, other secure systems interfacing with system 100, such as consumer 106 include chips similar to SOC 120, such as chip 103. Accordingly, a double-blind encryption scheme can be incorporated in which neither a source system nor a destination system has direct or indirect observability to the value of its own private key for export directly or as an encoded representation. Accordingly, the values of the private keys can be protected from attacks made on the systems to determine the values of the private keys. The ability of a source system to communicate with a destination system can be based upon the ability of both systems being blind systems, thereby assuring a double blind encryption scheme is used.

Figure 4:
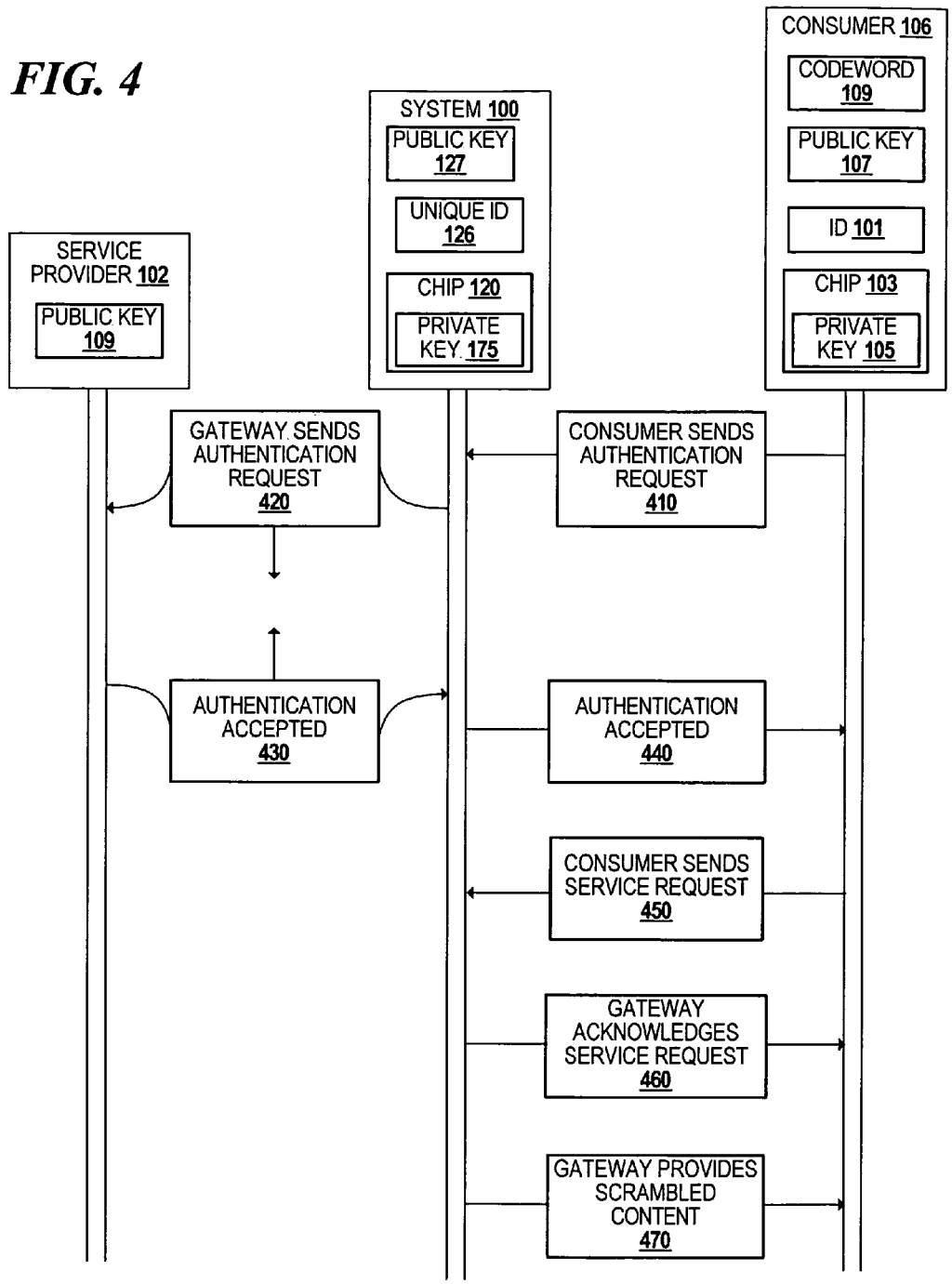
FIG. 4 is a diagram illustrating a method of providing content between a service provider and a consumer according to one embodiment of the present disclosure.

Referring now to FIG. 4, a flow diagram illustrating a method of providing content between a service provider, such as service provider 102 (FIG. 1), and a consumer, such as consumer 106 (FIG. 1) is shown, according to one embodiment of the present disclosure. In the illustrated embodiment, the consumer 106 is associated with an ID 101, a public key 107, and includes chip 103, having a protected private key 105. System 100 (FIG. 1) is associated with a unique ID 126, a public key 127 and includes SOC 120 having a protected private key 175 associated with the system 100. Service provider 102 is associated with a public key 109. System 100 operates as a gateway and provides authentication and content between the service provider 102 and the consumer 106.

In step 410, the consumer 106 provides an authentication request to the system 100. The authentication request includes the ID 101, associated with the consumer 106. In step 420, the system 100 provides an authentication request, for consumer 106, to the service provider 102. The authentication request provided by system 100 includes an encrypted representation of ID 101 and ID 126, associated with system 100. The representations of Ids 101 and 126 are encrypted using public key 109. In step 430, once the service provider 102 has validated Ids 101 and 126, the service provider 102 sends a validation response, indicating authentication was successful, to the system 100. The validation response includes an encrypted representation of public codeword 109. The encrypted representation of public codeword 109 is encrypted using public key 127. In step 440, system 100 provides a validation response to consumer 106. The validation response includes an encrypted representation of public key 127. The encrypted representation of public key 127 is encrypted using public codeword 109.

In step 450, the consumer 106 sends a service request to the system 100. The service request is encrypted by consumer 106 using public key 127. In step 460, response to the service request of step 450, the system 100 sends the consumer 106 an acceptance. The acceptance includes a codeword value, which is encrypted using public codeword 109. In one embodiment, the codeword value is randomly generated by SOC 120, such as through codeword generator 180 (FIG. 1).

In step 470, the system 100 provides scrambled content to the consumer 106. The content is scrambled using the codeword provided to the consumer 106 in step 460.

Figure 5:
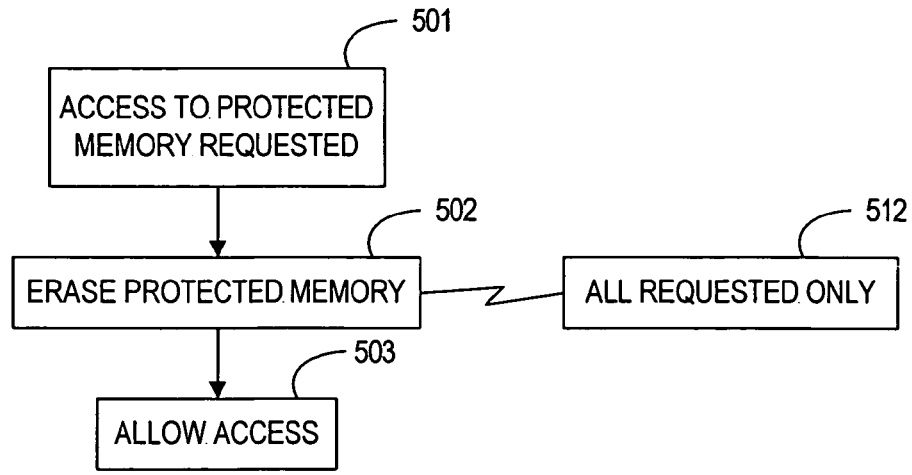
FIGS. 5 and 6 are flow diagrams illustrating specific embodiment of decoupling protected memory from external interfaces of a system on a chip.
Figure 6:
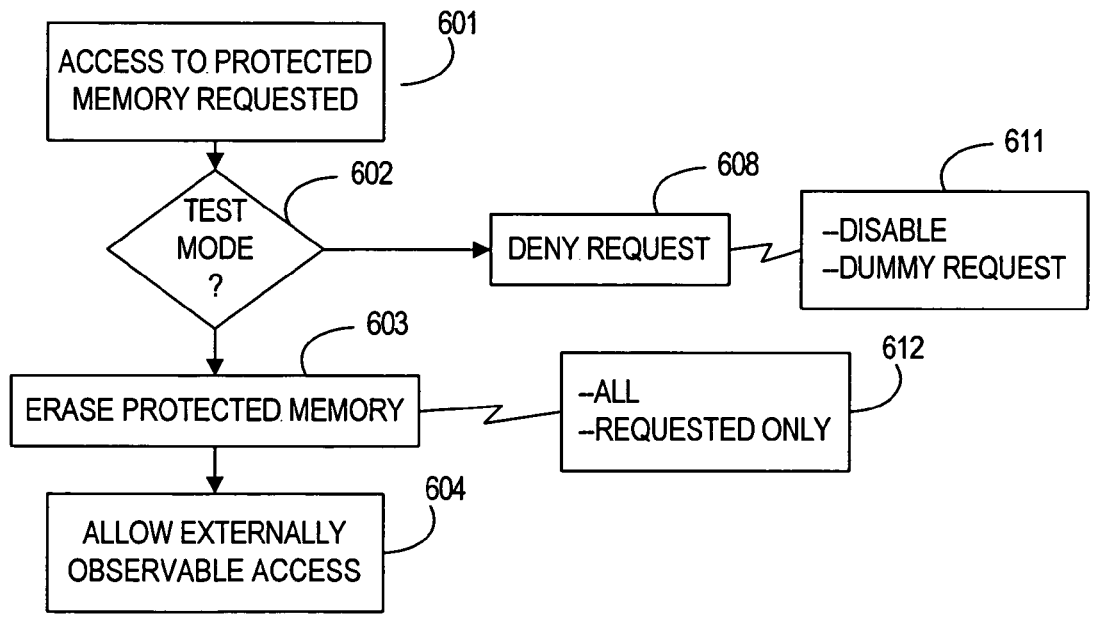

FIGS. 5 and 6 illustrate specific embodiments of the present disclosure relating to decoupling of protected memory from external interfaces of an SOC. In FIG. 5, at step 501, an unauthorized access to protected memory is requested. In one embodiment, an unauthorized access is any access of a private key location by a device other than the decryption engine. In another embodiment, an unauthorized access is a request that would provide information to a location that would potentially make data at the protected location observable external the system.

At step 502, the protected memory is erased in response to the request. Either some or all of the protected memory can be erased in response to any and all requests. In one embodiment, only the specific location being accessed is erased.

At step 503, access to the protected memory is allowed after it has been erased. In this manner, the protected memory is decoupled from external interfaces in that the contents of the protected memory cannot be provided to external interfaces.

In FIG. 6, at step 601, an access to protected memory is requested.

At step 602, a determination is made whether the system is in a test mode. If not in test mode, flow proceeds to step 608, where the access request is denied. As indicated in block 611, the access can be denied by disabling access to the protected memory, or by providing dummy data in response to the request. By denying the request for data stored at the protected memory when not in test mode, it remains decoupled from the external interface.

When in test mode, the flow proceeds from step 602 to step 603. At step 603, the protected memory is erased in response to being in test mode. Block 612 indicates that the protected memory can all be erased in response to merely entering test mode. Alternatively, protected memory can be erased as it is requested during test mode. In this manner, the protected memory remains decoupled from the external interfaces of the Soc.

At step 604, externally observable accesses are allowed after the protected memory is erased.

In the preceding detailed description of the embodiments, reference has been made to the accompanying drawings which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical and electrical changes may be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A system on a chip (SOC) device comprising:
   external output interfaces to provide information from the SOC device;
   external input interfaces to provide information to the SOC device;
   a first secure storage location operably de-coupled from all external output nodes of the SOC device during a normal mode of operation to prevent representations of data to be stored at the first secure storage location from being provided at an external output interface; and
   a decryption engine comprising a first data input, a private key input coupled to a first portion of the first secure storage location, and an output coupled to a second secure storage location, the decryption engine operable to determine decrypted data from data received at the first data input based on a private key received at the private key input, and further operable to write the decrypted data only to the first secure memory location and the second secure storage location.

2. The system of claim 1, wherein the first storage location is operably decoupled from all external devices by preventing access to the first storage location.

3. The system of claim 1, wherein the first storage location is operably decoupled from all external devices by destroying the data at the first storage location in response to being accessed.

4. The system of claim 1, wherein a second secure storage location coupled to the output of the decryption engine is operably de-coupled from all external output nodes of the SOC device during a normal mode of operation to prevent data stored at the second secure storage location from being provided at an external output interface.

5. The method of claim 4, wherein a first portion of the first secure storage location is a write-once storage location.

6. The method of claim 4, wherein the first portion of the first secure storage location is a write-many storage location.

7. The system of claim 4, wherein a first portion of the first secure storage location comprises a non-volatile storage location for a first private key storage location.

8. The system of claim 7, wherein the first secure storage location comprises a plurality of private key storage locations.

9. The system of claim 8, wherein the plurality of private key storage locations are part of the first portion of the first secure storage location.

10. The system of claim 4 further comprising:
    a descrambler comprising a first data input, a control word input coupled to a first portion of the second secure storage location during normal operation, and an output, the descrambler operable to access a control word only from the second secured storage location, wherein the control word is used by the descrambler to descramble scrambled data.

11. The system of claim 10 further comprising a random number generator comprising an output, the random number generator operable to provide a random number at the output.

12. The system of claim 11, wherein the output of the random number generator is coupled to the second secure storage location.

13. The system of claim 12, wherein the output of the random number generator is operably coupled to have exclusive write access to a predefined location of the second secure storage location during normal operation.

14. The system of claim 13 further comprising:
    an encryption engine comprising a first data input coupled to the second secure storage location, a public key input to receive a public key, and an output to provide an encrypted representation of data received at the first data input.

15. The system of claim 14, where in the encryption engine is operable to provide the encrypted representation to an external output interface.

16. The system of claim 15, where in the first secure storage location being operably de-coupled from all external output nodes of the SOC device further comprises the first secure storage location being de-coupled from the data input and the public key input of the encryption engine.

17. The system of claim 16 further comprising a transcoder operably coupled to the output of the descrambler to receive a first image having a first resolution and to provide a second image, based on the first image, having a second resolution, the second resolution being less than the first resolution.

18. The system of claim 16 further comprising a transcoder operably coupled to the output of the descrambler to receive a first image at a first bit rate and to provide a second image, based on the first image, having a second bit rate, the second resolution being less than the first resolution.

19. The system of claim 16 further comprising a watermark module coupled to the output of the de-scrambler, the watermark module operable to provide a watermark to image data from the output of the de-scrambler.

20. The system of claim 1, wherein the decryption engine is operable to execute a decryption algorithm in parallel in hardware.

21. The system of claim 19 further comprising:
a scrambler comprising a first data input, a control word input coupled to a second portion of the second secure storage location, and an output, the scrambler operable to access a control word only from the second secured storage location, wherein the control word is used by the scrambler to scramble data received at the first input.

22. A system comprising:
a source system comprising a system on a chip device operable exclusively in a blind encryption mode during a normal mode of operation, wherein no private key of the source system is observable external the system on a chip;
a destination system coupled to the source system, the destination system device operable exclusively in the blind encryption mode during the normal mode of operation, wherein no private key of the destination system is observable external the system on a chip.

23. The system of claim 22, wherein the source system is operable only in a double-blind-securing mode, wherein the destination system is operable in the blind encryption mode.

24. A method comprising:
when in a normal mode of operation
allowing observability of a private key stored at a first secured storage location of the system on a chip to a decryption engine of a system on a chip while not allowing observability of the private key external the system on a chip;
allowing write access to a second secured storage location of the system on a chip to the decryption engine, where the second location is not observable external the system on a chip.

25. The method of claim 24, wherein the second secured storage location of the system on a chip is read accessible during normal operation only by a scrambling engine of the system on a chip.

26. The method of claim 24 further comprising:
erasing information stored at the first secured storage location in response to a first access request during normal operation.

27. The method of claim 26, wherein the first access request would make data stored at the first secured location observable.

28. The method of claim 26 further comprising:
erasing information stored at the second secured storage location in response to the first access request during normal operation.

29. The method of claim 28, wherein the first access request would make data stored at the second secured location observable.

30. The method of claim 26 further comprising:
erasing information stored at the second secured storage location in response to a second access request during normal operation.

31. The method of claim 24 further comprising:
ignoring an access request to the first secured storage location during normal operation.

32. The method of claim 31, wherein the access request would make data stored at the first secured location observable.

33. The method of claim 24 further comprising:
providing dummy data in response to an access request to the first secured storage location during normal operation.

34. The method of claim 24, wherein providing access only to a second secured storage location of the system on a chip for a value decrypted by the decryption engine, where the second location is not observable external the system on a chip.

35. The method of claim 24 further comprising:
erasing information stored at the first secured storage location in response to a request to enter a test mode of operation.

36. The method of claim 24 further comprising:
erasing information stored at the second secured storage location in response to the request to enter the test mode of operation.

37. The system of claim 1 further comprising a unique SOC identifier.

38. The system of claim 1, wherein the decryption engine is further operable to provide the decrypted data only to the second secure storage location during a normal mode of operation.

* * * * *